W. E. SIMONS.
TRACTOR.
APPLICATION FILED FEB. 4, 1919.

1,335,614.

Patented Mar. 30, 1920.
3 SHEETS—SHEET 1.

INVENTOR
W. E. SIMONS.
BY
ATTORNEYS

W. E. SIMONS.
TRACTOR.
APPLICATION FILED FEB. 4, 1919.
1,335,614.
Patented Mar. 30, 1920.
3 SHEETS—SHEET 2.
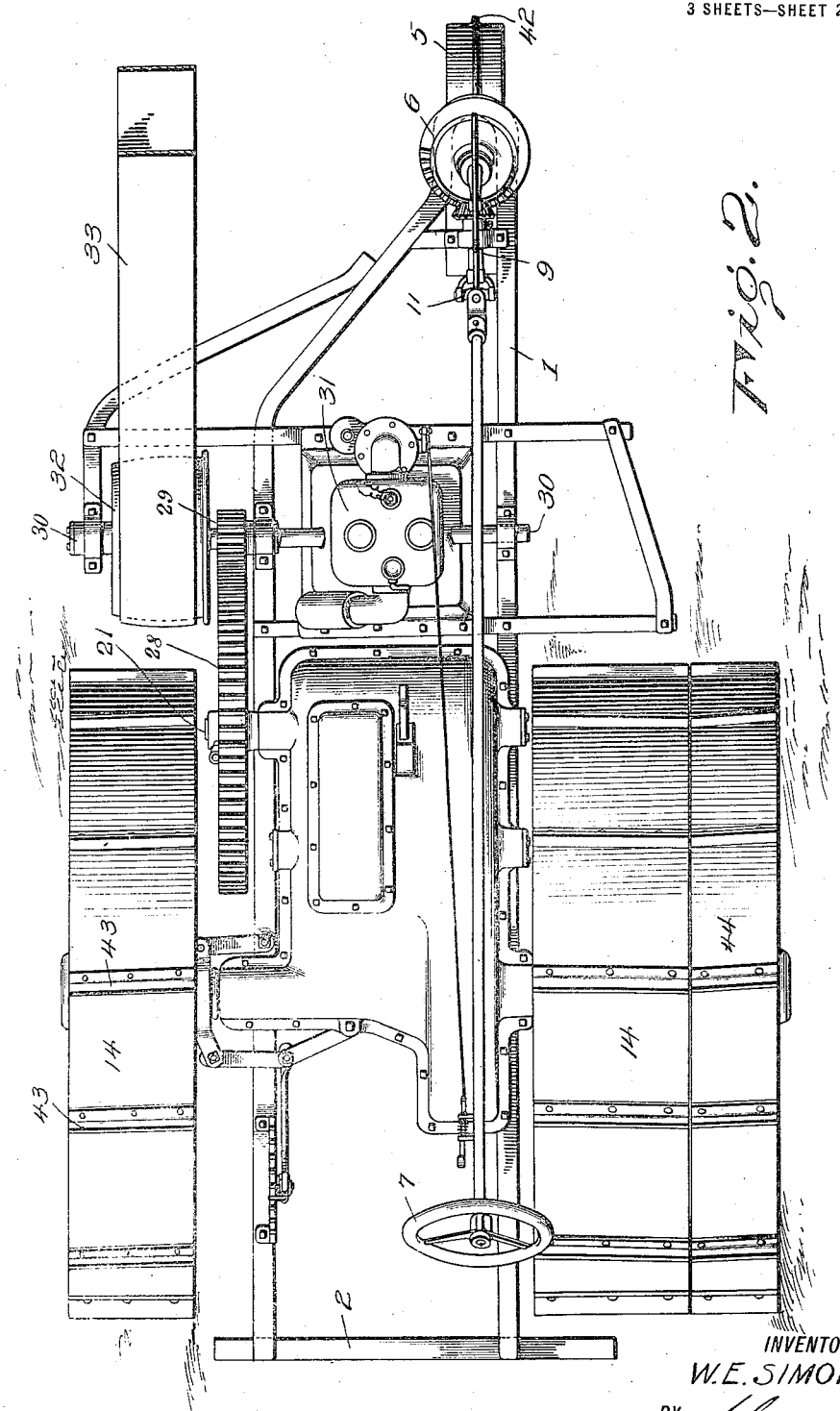
INVENTOR
W.E. SIMONS.
BY
ATTORNEYS

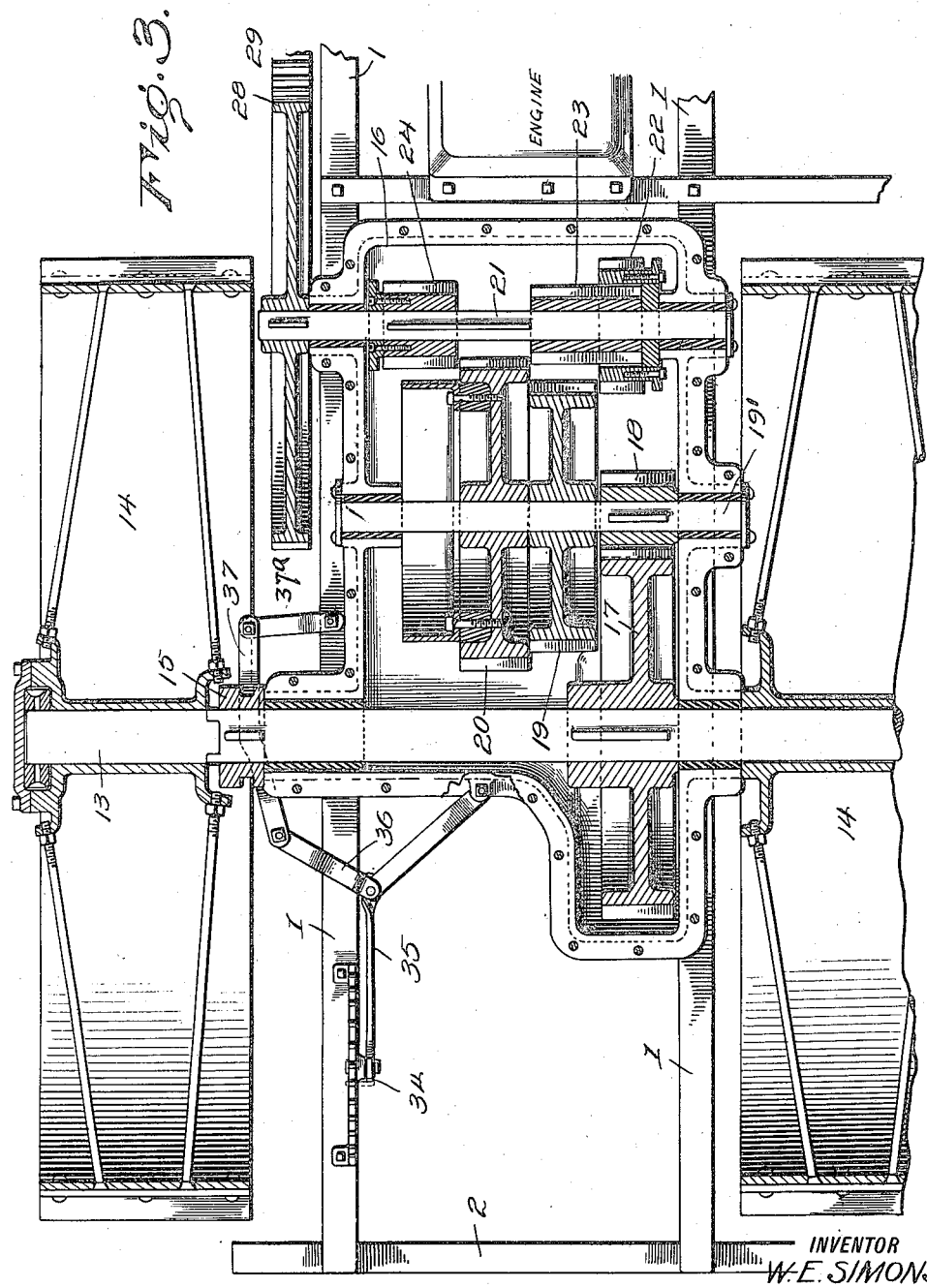

UNITED STATES PATENT OFFICE.

WAYNE ELGIN SIMONS, OF BOYD, OREGON.

TRACTOR.

1,335,614.

Specification of Letters Patent. Patented Mar. 30, 1920.

Application filed February 4, 1919. Serial No. 274,888.

*To all whom it may concern:*

Be it known that I, WAYNE E. SIMONS, a citizen of the United States, and a resident of Boyd, in the county of Wasco and State of Oregon, have invented certain new and useful Improvements in Tractors, of which the following is a specification.

My invention is an improvement in tractors, and has for its object to provide a device of the character specified especially designed for drawing farm machines in hilly and soft ground and in hill side work, and wherein the transmission is inclosed to protect it from dirt and the like.

In the drawings:

Fig. 2 is a top plan view, and

Fig. 3 is a horizontal section.

Figure 1:
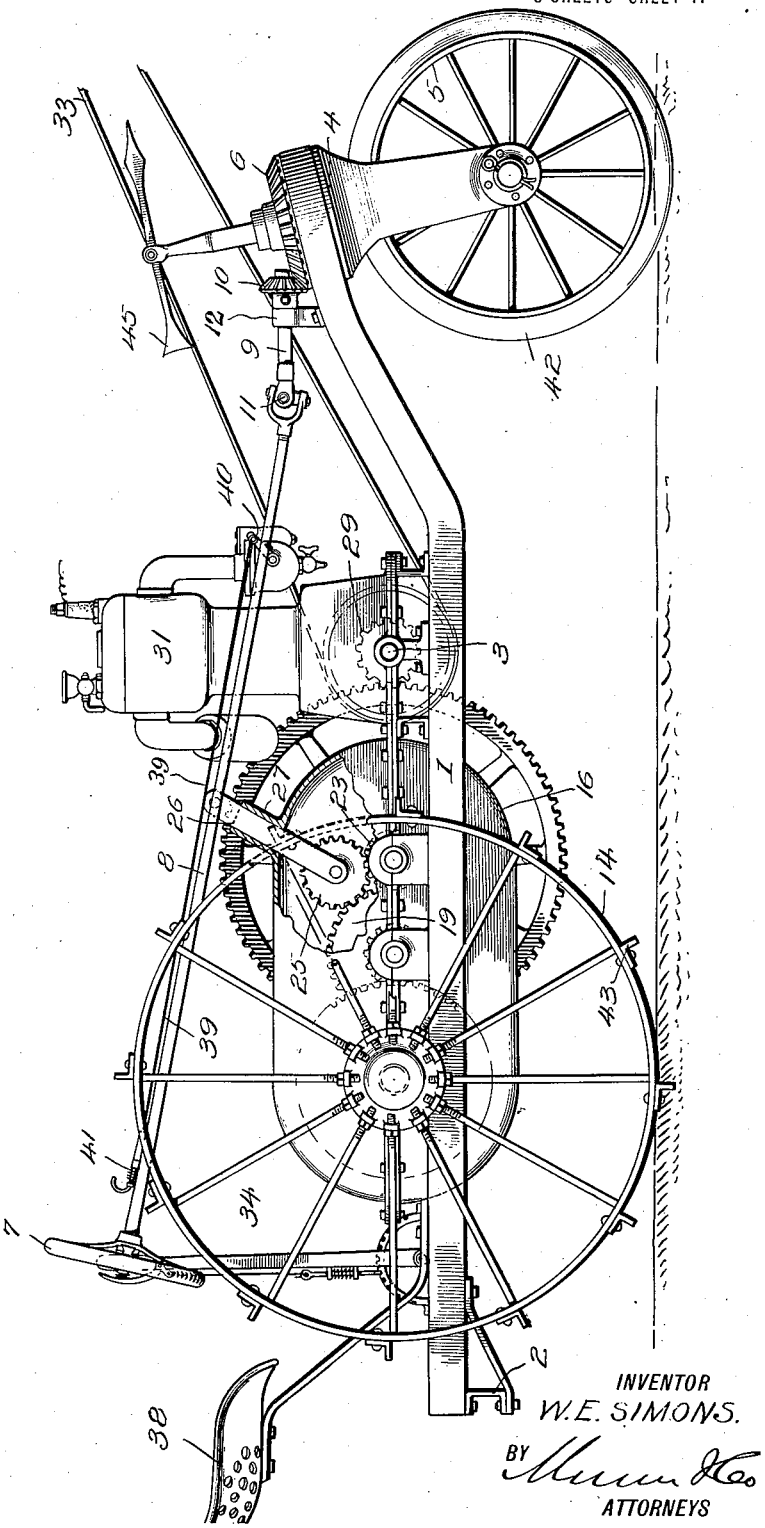
Figure 1 is a side view of the improved tractor with parts broken away.

In the present embodiment of the invention, a suitable supporting frame is provided, the said frame consisting of side members 1 which converge at their front ends as shown, and are connected at their rear end by cross bars 2.

At the converging front ends a yoke 4 is journaled, and a front wheel 5 is arranged between the arms of the yoke. The body of this yoke has rigid therewith and above the frame a gear segment 6.

A steering wheel 7 is secured to a steering shaft 8 which is journaled in suitable supports on the frame, and this shaft has a front section 9 which is provided with a beveled gear 10 meshing with the gear segment 6, the section 9 being connected to the section 8 by means of a universal joint 11. The shaft section 9 is supported in a bearing 12 on the frame.

A rear axle 13 is journaled transversely of the frame, and wheels 14 are arranged on the ends of the axle. One of the wheels 14 is rigidly secured to the axle, and the other is revolubly mounted thereon and is adapted to be connected to the axle by a clutch mechanism indicated at 15 in Fig. 3. A gear or transmission casing 16 is connected to the frame at the rear axle, the said axle passing through the casing, and a gear wheel 17 is keyed to the axle within the gear casing.

This gear wheel 17 meshes with a pinion 18 keyed to a counter-shaft 19′ also journaled in the gear casing in front of the axle, and the said counter-shaft carries two gear wheels or pinions 19 and 20 of unequal diameter and rigid with the counter-shaft.

A transmission shaft 21 is journaled in the gear casing in front of the counter-shaft, and the transmission shaft carries pinions 22, 23, 24 within the gear casing, the said pinions being feathered or splined on the shaft, and pinion 22 is movable longitudinally thereof.

The pinion 23 is a wide pinion, and the pinion 22 is slidable thereover, being merely a gear ring, having an external series of teeth adapted to mesh with the gear wheel 19.

The engagement of the gear wheels 19 and 22 provides low speed, and the engagement of the gear wheels 20 and 24 provides high speed, and the engagement of the gear wheels 19 and 23 provides through an idler 25, a reverse.

This idler 25 is journaled on a slide 26 which is movable through a guide 27 in the gear casing 16 into and out of mesh with the gears 19 and 23. A gear wheel 28 is keyed to the shaft 21 outside of the gear casing, and this gear wheel meshes with a pinion 29 on the shaft 30 of an internal combustion engine indicated at 31 and of usual construction.

A belt wheel or pulley 32 is journaled loosely on the motor shaft and by means of a belt 33 the pulley may be connected to machinery to be driven, as for instance, a threshing machine. The loose ground wheel has a clutch face on the inner end of the hub and the movable portion of the clutch 15 which is a grooved collar splined on the axle has a clutch face adapted to coöperate with the clutch element on the hub of the ground wheel.

The movable portion of the clutch 15 is controlled by a lever 34 which is pivoted to the frame, and has latch mechanism for coöperating with a toothed quadrant for holding it in adjusted position. The lever is connected by a link 35 with toggle levers 36, one of which is pivoted to the gear casing at its outer end, and the other is pivoted to a yoke 37 which is pivoted to a bracket 37ª extending outwardly from the frame forwardly of the axle and which operates the clutch the yoke engaging within the groove of the movable member of the clutch. This lever 34 and the steering wheel 7 are arranged adjacent to the seat 38, so that the driver in the seat may control both the lever and the wheel.

Upon the shaft 8 is slidably mounted a link or rod 39 which controls the throttle 40 of the engine. This link or rod is normally movable in one direction by a coil spring 41, and it has a hook adjacent to the steering wheel for convenience in operating the link.

Referring to Figs. 1 and 2, it will be noticed that the wheel 5 has a continuous radial rib 42 at the center of its peripheral surface for preventing side slipping, and the wheels 14 have transverse cleats 43 for increasing traction. In order to prevent upset in hill side work when turning to the right, the right wheel 14 of the tractor has an extension 44, the said extension consisting of a rim registering with the rim of the wheel, and provided with cleats which register with the cleats of the wheel, and the said extension increases the engaging surface of the wheel approximately 50%, being one-half the width of the rim of the wheel.

An indicating arrow 45 is connected with the yoke for indicating the direction in which the tractor is turned. The gear casing 16 is a closed casing, and is adapted to be filled with oil, so that the transmission runs in oil. In operation, the operator occupies the seat 38 where the clutch lever 34, the steering wheel 7, and the link 39 are all within his reach.

For the low speed, he will engage the gear 23 with the gear 19. For the high speed, he will engage the gear 24 with the gear 20, and for the reverse he will engage the gear 25 with the gears 19 and 23. Any suitable mechanism may be provided for operating the gears of the transmission.

The right wheel 14 is at all times rigid with the axle, the left wheel being arranged to be released during turning, thus permitting a differential connection between the wheels to be dispensed with. This is an advantage in side hill work, since most of the weight will be on one drive wheel, while the differential gear gives power equal to both wheels.

I claim:—

In a tractor, a supporting frame, an axle journaled therein, means for driving the axle, a ground wheel rigidly secured on one end of the axle, a ground wheel revolubly mounted on the other end of the axle, a clutch element on the inner end of the hub of the loose wheel, a grooved collar splined upon the axle and having a clutch face engageable with said clutch element, a bracket extending outwardly from said frame forwardly of the axle, a yoke pivoted upon said bracket, engaging within said groove and extending rearwardly beyond the axle, a link pivoted at one end upon the frame near the longitudinal center thereof and extending in a rearwardly inclined direction, a second link pivoted upon the rear end of the yoke and pivotally connected with the rear end of said first named link, a lever pivoted upon the frame for movement in a vertical plane, a link connected with the lever and with the pivotal connection of said links, and means for holding said lever in selected positions.

WAYNE ELGIN SIMONS.